Dec. 8, 1931. A. S. HOWELL 1,835,493
MOTION PICTURE CAMERA AND THE LIKE
Filed Feb. 6, 1928 3 Sheets-Sheet 2
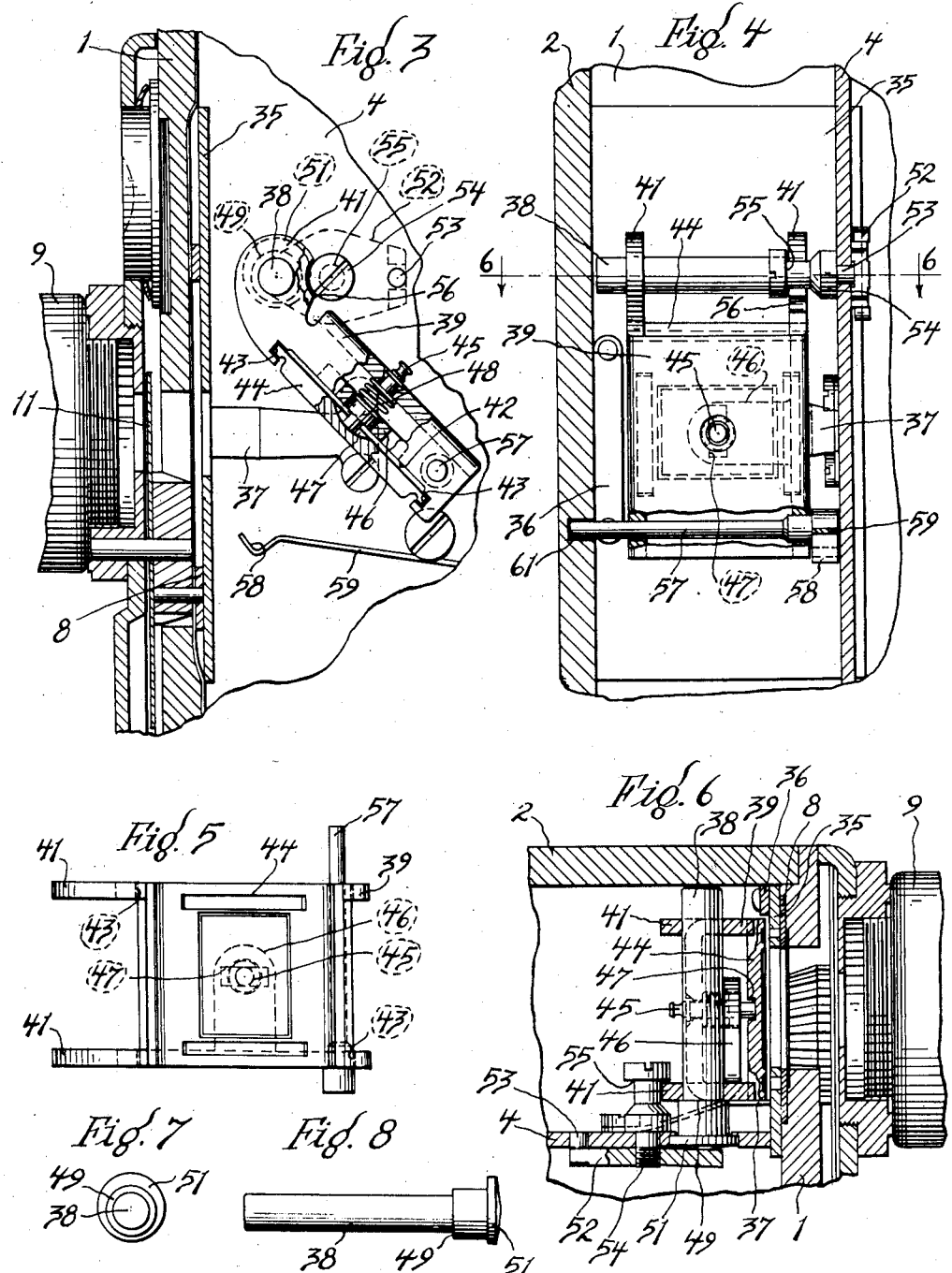
Inventor
Albert S. Howell
By Miehle & Miehle,
Attorneys.

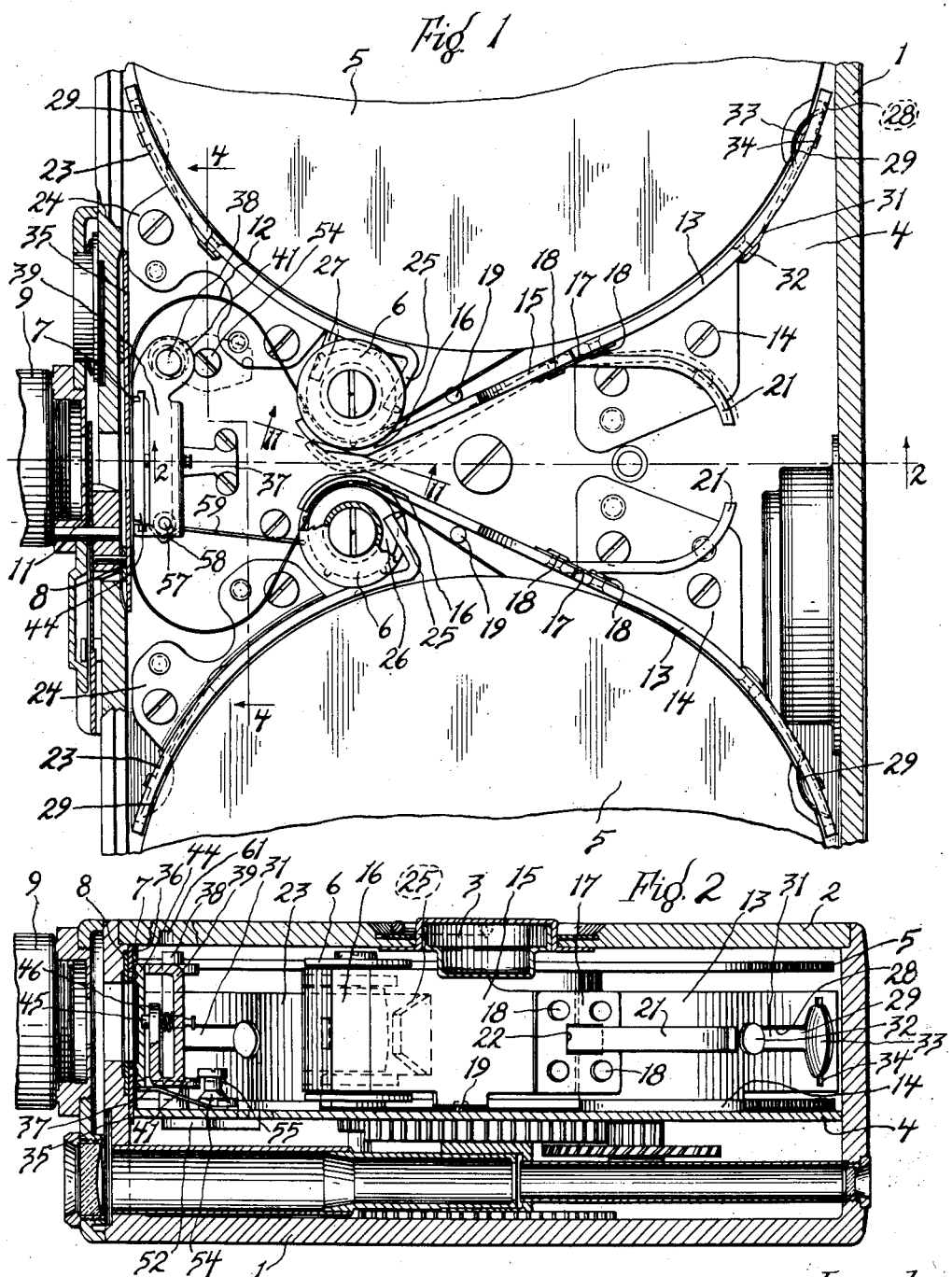

Dec. 8, 1931.   A. S. HOWELL   1,835,493
MOTION PICTURE CAMERA AND THE LIKE
Filed Feb. 6, 1928   3 Sheets-Sheet 3
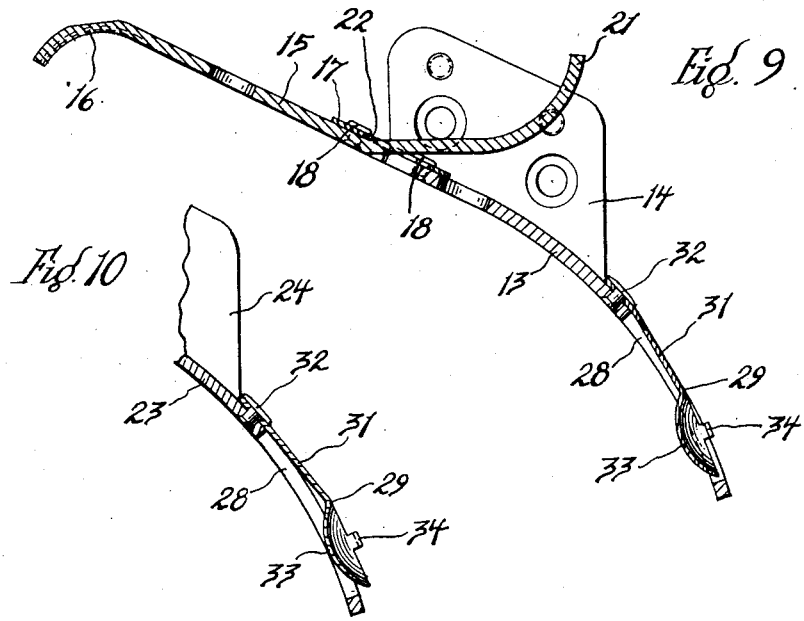
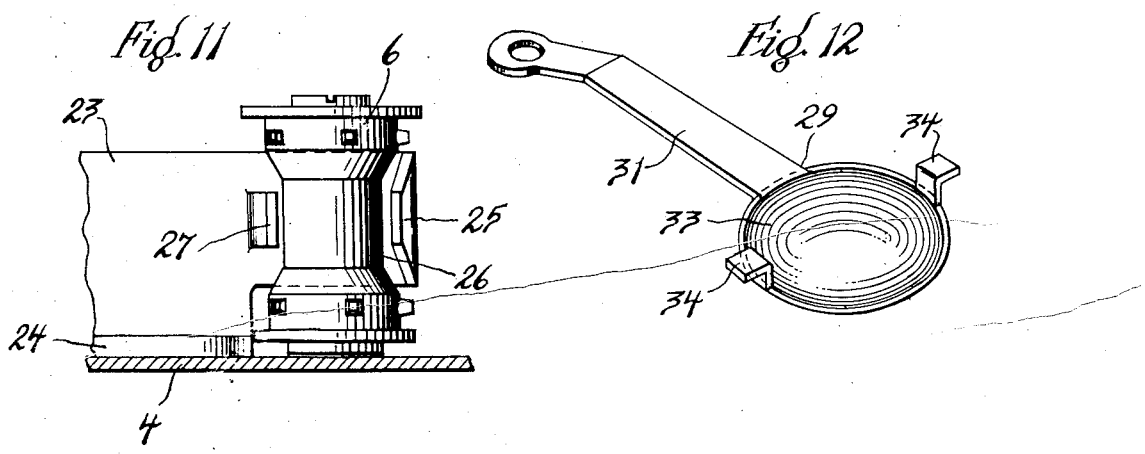
Inventor
Albert S. Howell
By Miehle & Miehle,
Attorneys.

Patented Dec. 8, 1931

1,835,493

UNITED STATES PATENT OFFICE

ALBERT S. HOWELL, OF CHICAGO, ILLINOIS, ASSIGNOR TO THE BELL & HOWELL COMPANY, OF CHICAGO, ILLINOIS, A CORPORATION OF ILLINOIS

MOTION PICTURE CAMERA AND THE LIKE

Application filed February 6, 1928. Serial No. 252,165.

My invention relates to motion picture cameras although not limited to this use alone, and relates particularly to film guide means, the general object of the invention residing in the provision of simple, effective, and dependable film guiding means which affords quick and convenient lacing and unlacing of a film thereon.

With this object in view my invention consists in certain features of novelty in the construction, combination, and arrangement of parts by which the said object and certain other objects, hereinafter appearing, are effected, all as fully described with reference to the accompanying drawings and more particularly pointed out in the claims.

In the said drawings—

Figure 1 is a partial side elevation of a motion picture camera with the cover thereof removed and with parts broken away shown in section;

Figure 2 is a section on the line 2—2 of Figure 1;

Figure 3 is an enlarged partial side elevation similar to Figure 1 and showing certain parts in different positions than those in which they are shown in Figure 1;

Figure 4 is a partial sectional view on the line 4—4 of Figure 1;

Figure 5 is a front elevation of the film guide gate of the camera, hereinafter described;

Figure 6 is a partial section on the line 6—6 of Figure 4;

Figures 7 and 8 are respectively end and side elevations of the film guide gate bearing stud of the camera, hereinafter described;

Figure 9 is a longitudinal section of one of the film guard assemblies;

Figure 10 is a partial section similar to Figure 9 showing a part in a different position as hereinafter described;

Figure 11 is a partial sectional view on the line 11—11 of Figure 1; and

Figure 12 is a perspective view of one of the film contact members, hereinafter described.

Like characters of reference indicate like parts in the several views.

Referring to the drawings and particularly Figures 1 and 2 thereof, 1 designates a camera casing open at one side, and this open side is closed by a door or cover 2 removably attached in closed position on the casing by means of a suitable releasable locking mechanism generally indicated at 3. Secured in the casing is a mechanism frame plate 4 which is disposed inwardly of the open side of the casing and in parallelism with the plane of the open side. The frame plate 4 carries a pair of vertically spaced film reels 5 within the casing by means unnecessary to be described, these reels being revoluble and axially removable in the usual manner and being retained against axial removal by the door or cover 2 when in closed position on the casing.

The reels 5 are disposed in film feeding alinement, and a pair of vertically spaced revoluble film sprockets 6 are disposed within the casing between the reels 5 in film feeding alinement therewith and adjacent respective thereof. An intermittent film feed exposure guide, generally indicated at 7 in Figures 1 and 2, is disposed within the casing 1 on the inside of the front wall of the casing forwardly of and in film feeding alinement with the sprockets 6. A film in the guide 7 is fed therethrough by an intermittent feeding mechanism generally indicated at 8, operating in synchronism with rotation of the sprockets 6, and is intermittently exposed therein through a photographic lens 9 by means of a shutter 11 operating in synchronism with the intermittent feed mechanism. A film 12 is fed from the upper reel 5 under and about the upper sprocket 6, thence in a compensating loop to the upper end of the intermittent feed guide 7, thence from the lower end of the guide 7 in a compensating loop and over and about the lower sprocket 6, and thence to the lower film reel 5 upon which it is rewound, the lower film reel 5 being driven as is usual to rewind the film thereon. See Figure 1.

In order that the film 12 may be maintained in proper relation with each film reel 5 and adjacent sprocket 6 the following film guard and retaining means is provided and inasmuch as the film guard and retaining means of each reel and its adjacent sprocket are substantially the same, except as hereinafter noted, but one such means will be described, it being understood that such description is applicable to both and like characters of reference being applied to both of such means on the drawings.

Referring to Figures 1, 2 and 9 to 12 inclusive, a stationary film face guard member 13 is secured on the outside of the frame plate 4, as designated at 14, and extends about in adjacent relation with a portion of a reel 5 at the rear of the sprocket 6 adjacent this reel and is spaced from this sprocket. See Figures 1 and 2. A second film face guard member 15, provided with a forward curved portion 16 adapted to retain the film on this sprocket 6, is carried with the guard member 13 in forwardly continuing relation therewith for pivotal movement with respect thereto into and out of film retaining relation with this sprocket by means of a spring blade member 17 secured to the adjacent end portions of the guard members 13 and 15, as designated at 18, and providing the pivotal movement of the guard member 15 by the flexure thereof. See Figures 1, 2, and 9. As shown the spring blade member 17 yieldably urges the film guard member 15 into film retaining relation with the sprocket 6 and a stop lug 19 secured on the frame plate is engaged by the intermediate portion of the guard member 15 to position this guard member in film retaining relation with the sprocket 6. The guard member 15 is provided at its rear end with a rearwardly extending curved extension 21 passing through an intermediate aperture 22 through the spring blade member 17 for the convenient manual actuation of the guard member 15 out of film retaining relation with the sprocket 6 for the lacing and unlacing of film thereon. In Figure 1 the film retaining position of a guard member 15 is shown in full lines while its position out of film retaining position is shown in broken lines.

Another stationary film face guard 23 is secured on the outside of the frame plate 4, as designated at 24, and extends about in adjacent relation with a portion of a reel 5 adjacent and at the front of the sprocket 6 adjacent this reel. This guard 23 has the end portion 25 thereof adjacent the sprocket 6 reduced transversely and projecting into the space provided by the reduced diameter of the intermediate portion of the sprocket 6, as designated at 26 in Figure 11, for properly guiding the film to the upper sprocket and for stripping the same therefrom as it passes from the lower sprocket. The upper film guard 23 is provided with another stripper portion 27 which projects into the space 26 provided by the reduced diameter of the intermediate portion of the sprocket 6 on the side of the sprocket opposite that on which the stripper formation 25 is disposed, and serves to strip film from the upper sprocket 6 as it passes therefrom.

The rearward portion of the guard member 13 and the forward portion of the guard member 23 are provided with longitudinally extending apertures 28 therethrough. See Figures 1, 2, 9, and 10. On each of these film guards 13 and 23 is secured, a one piece film contact member 29 formed of flat stock. These contact members are inclusive of resilient shank portions 31 of relatively small cross section secured at one end, as designated at 32, on the outer faces of respective of the guard members 13 and 23. Relatively large dished film contact portions 33 are formed at the free ends of the shank portions 31 of the contact members and have the convex surfaces thereof facing inwardly of the peripheries of the flanges of the reel 5 and yieldably urged by the shank portions 31, through the apertures 28 of the guard members 13 and 23, inwardly of the periphery of the reel flanges. Lugs 34 are formed at the edges of the contact portions 33 of the contact members 29 and are engageable with the outer faces of the guard members 13 and 23 to limit movement of said contact portions 33 inwardly of the periphery of the reel flanges.

Thus is provided a simple, effective, and dependable guard means for the film, it being observed that the film is adequately guided and retained with respect to the reels 5 and the sprockets 6. The contact members 29 serve to retain the film on the reels 5 within the flanges thereof, at the same time permitting convenient axial removal and replacement of the reels 5, the convex surfaces of the contact portions 33 having a cam action with the periphery of the reel flanges as the reels are axially removed or installed.

The intermittent film feed guide 7 is constructed as follows. An apertured front film face guide plate 35 is secured on the rear face of the front wall of the casing and is provided at its outer edge with a guide rail 36 providing an outer film edge guide. A spring guide member 37 is secured on the outer face of the frame plate 4 and provides an inner film edge guide. The rear film face guide is in the form of a film gate pivotally mounted for movement into and out of film guiding position for the convenient lacing and unlacing of film in the guide and will now be described.

Mounted on the frame plate 4 in a manner hereinafter described, is a bearing stud 38 which projects outwardly from the plate. A gate member 39 of longitudinally extending U-shaped formation has the upper ends of the legs thereof in the form of concentrically bored ears 41 which are pivotally engaged on the projecting portion of the stud 38 for the angular movement of the gate member into and out of film guiding position, these ears being movable over the outer end of the stud 38 for the removal and replacement of the gate member. See Figures 1 to 6 inclusive. The outer longitudinal edge portions of the legs of the said U-shaped formation of the gate member are recessed to form a transverse channel 42 and the ends of this channel are undercut to form spaced parallel opposing relatively wide grooves 43. A rectangular film contact plate 44 has opposite relatively thin edges thereof engaged in said grooves 43 for removal and replacement thereof on the gate member and for a slight facewise movement with respect thereto. A stud 45 is disposed normal to the plane of the plate 44 and in central relation therewith and is slidably engaged in a central aperture through the intermediate portion of the gate member 39 and in an aperture through an inwardly projecting extension 46 on the outer leg of the U-shaped formation of the gate member immediately to the rear of the plate 44. See particularly Figures 2 and 3. The forward end of the stud 45 is engageable in a recess 47 formed in the rear face of the plate 44 to secure the plate on the gate member, and a coiled compression spring 48 encircles the stud 45 and reacting on the gate member forwardly engages a shoulder on this stud to yieldably engage in the recess 47 and abut the bottom thereof to releasably maintain the stud in engagement with the recess and to yieldably urge the plate 44 forwardly for a slight pressure engagement with the film in the guide when the gate member is in film guiding position. It will be observed that the plate 44 may be quickly and conveniently removed from or replaced on the gate member 39 when the stud 45 is withdrawn from the recess 47 of the plate 44 against the influence of the spring 48.

The inner portion of the stud 38 is shouldered, as designated at 49, and the inner end of this stud is provided with an eccentrically disposed head 51. See Figures 3, 6, 7, and 8. The stud 38 passes through a shouldered bore in the frame plate 4 with the eccentric head 51 thereof engaged in the enlarged portion of the bore, so that angular movement of the stud effects eccentric adjustment of the outer portion thereof for the purpose of affording an adjustment of the gate member 39 to properly position the same in relation with the front face guide plate 35 when the gate member is in film guiding position. A clamp member 52 is disposed on the inside of the frame plate 4 and overlies the head 51 of the stud 38 with one end thereof and is provided with a positioning lug 53 at the other end thereof which engages in an aperture in the frame plate 4. See Figures 3, 4, and 6. A head screw 54 passes through an aperture through the frame plate 4 at the rear of and in adjacent parallelism with the stud 38 and is screwthreaded into the intermediate portion of the clamp member 52 whereby to clamp the head of the stud 38 against the shoulder of the bore through the frame plate 4 engaged thereby for the purpose of securing the stud 38 in the angular adjustment thereof.

The head of the screw 54 is disposed on the outside of the frame plate 4 and is undercut as designated at 55, and the inner ear 41 of the gate member 39 is normally engaged in said undercut, as shown in Figure 6, to limit outward movement of the gate member on the stud 38. The inner ear 41 of the gate member 39 is cut away, as designated at 56, so that when the gate member is angularly positioned out of its film guiding plane, as shown in Figure 3, said inner ear 41 is disengaged from the undercut 55 to permit removal and replacement of the gate member on the stud 38 with obvious convenience.

The hereinabove described film gate is disposed within the casing 1 on a pivotal axis normal to the plane of the open side thereof for movement into and out of film guiding position, and a stud 57 extends through and is fixed in coaxial bores of the legs of the U-shaped formation of the gate member 39 at the lower or free end thereof. See Figures 1, 4, and 5. This stud 57 projects inwardly and outwardly from the gate member and the inner end of the same is engaged in a notch formation 58 of a spring latch member 59 mounted on the frame plate 4 for releasably maintaining the gate in film guiding position. See Figures 1, 3, and 4. The outer end of the stud 57 projects into the plane of the closed position of the cover 2 and is engageable in a recess 61, see Figures 2 and 4, formed in the inner face of the cover to permit the cover being closed only when the gate is in film guiding position, this arrangement preventing positioning of the cover in closed position when the gate is out of film guiding position with obvious advantage.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. In a film reel guard the combination with a film face guard member extending about in adjacent relation with a portion of the periphery of an axially removable flanged revoluble film reel, and a film contacting member carried by said guard member and yieldably urged, through an opening through said guard member, inwardly of the periphery of the reel flanges between the same.

2. In a film reel guard the combination with a film face guard member extending about in adjacent relation with a portion of the periphery of an axially removable flanged revoluble film reel, and a film contacting member including a resilient shank portion secured at one end on the outer face of said guard member and extending longitudinally thereof and a film contact portion at the free end of said shank portion and yieldably urged by said shank portion, through an aperture through said guard member, inwardly of the periphery of the reel flanges between the same.

3. In a film reel guard the combination with a film face guard member extending about in adjacent relation with a portion of the periphery of an axially removable flanged revoluble film reel, and a one piece film contacting member formed of flat stock and including a resilient shank portion of relatively small cross section secured at one end on the outer face of said guard member and extending longitudinally thereof, a relatively large dished film contact portion at the free end of said shank portion and having the convex surface thereof facing inwardly of the periphery of the reel flanges and yieldably urged by said shank portions, through an aperture through said guard member, inwardly of the periphery of the reel flanges between the same, and lug means on the edge of said contact portion engageable with the outer face of said guard member to limit movement of said contact portion inwardly of the periphery of the reel flanges.

4. In a device of the character described the combination with a revoluble film sprocket, of a stationary film guard member, a second film guard member adapted for retaining film on said sprocket, and a spring blade member secured to said guard members whereby said second guard member is carried with said first guard member in continuing relation therewith for movement with respect thereto into and out of film retaining relation with said sprocket.

5. In a device of the character described the combination with a revoluble film sprocket, of a stationary film reel film guard member, a second film guard member adapted for retaining film on said sprocket, a spring blade member secured to said guard members whereby said second guard member is carried with said first guard member in continuing relation therewith for pivotal movement with respect thereto into and out of film retaining relation with said sprocket and yieldably urged by said spring member into said position, a stop for positioning said second guard member in said film retaining relation, and an actuating arm formed integrally with said second guard member and extending from the pivotal axis thereof.

6. In a device of the character described the combination with a revoluble film sprocket and an axially removable and revoluble flanged film reel disposed in film feeding alinement therewith and adjacent the same, of a stationary film guard member extending about in adjacent relation with a portion of the periphery of said reel and spaced from said sprocket, a second film guard member adapted for retaining film on said sprocket, a spring blade member secured to said guard members whereby said second guard member is carried with said first guard member in continuing relation therewith for pivotal movement with respect thereto into and out of film retaining relation with said sprocket and yieldably urged by said spring member into said position, and a stop for positioning said second guard member in said film retaining relation.

7. In a device of the character described the combination with a revoluble film sprocket and an axially removable and revoluble flanged film reel disposed in film feeding alinement therewith and adjacent the same, of a stationary film guard member extending about in adjacent relation with a portion of the periphery of said reel, and stripper means on said guard member adapted to strip film from said sprocket.

8. In a device of the character described the combination with a revoluble film sprocket and an axially removable and revoluble flanged film reel disposed in film feeding alinement therewith and adjacent the same, of a stationary film guard member extending about in adjacent relation with a portion of the periphery of said reel and having an end portion thereof disposed adjacent said sprocket, and a stripper formation on said end portion of said guard member adapted to strip film from said sprocket.

9. In a device of the character described the combination with a revoluble film sprocket and an axially removable and revoluble flanged film reel disposed in film feeding alinement therewith and adjacent the same, of a stationary film guard member extending about in adjacent relation with a portion of the periphery of said reel and having an end portion thereof disposed adjacent said sprocket, a stripper formation on said end portion of said guard member adapted to strip film from said sprocket, a second stationary film guard member extending about in adjacent relation with a portion of the periphery of said reel on the side of the sprocket opposite that on which said first mentioned guard member extends and spaced from said sprocket, a third film guard member mounted in continuing relation with said second guard member for movement with respect thereto into and out of film retaining relation with said sprocket and yieldably urged into said position, and film contacting members carried on said first mentioned and second guard members and yieldably urged inwardly of the periphery of the flanges of said reel between the same.

10. In a motion picture machine the combination with a frame member provided with a bore therethrough, of a headed stud projecting from said frame member and provided with an eccentric portion engaged in said bore for angular adjustment therein and having the shoulder of the head thereof engaged against said frame member, means engaging the top of the head of said stud for clamping said shoulder of said head against said frame member, and a film guide gate pivotally mounted on the projecting portion of the stud for movement into and out of the film guiding plane thereof.

11. In a motion picture machine the combination with a frame plate member provided with a shouldered bore therethrough, of an eccentrically headed stud projecting from said frame member and having the eccentric head thereof engaged in the enlarged portion of said bore for angular adjustment therein and with the shoulder of said head engaging the shoulder of said bore, a clamp member overlying the top of said head and the corresponding surface of said frame member, screw means for clamping said clamp member against said head and said frame member, and a film guide gate pivotally mounted on the projecting portion of said stud for movement into and out of the film guiding plane thereof.

12. In a motion picture machine the combination with a frame member provided with a bore therethrough, of a headed stud projecting from said frame member and provided with an eccentric portion engaged in said bore for angular adjustment therein and having the shoulder of the head thereof engaged against said frame member, means for clamping the head of said stud against said frame member including a headed screw passing through another aperture of said frame member in parallelism with said stud and having its head disposed on the side of said frame member corresponding with the projection of said stud, and a film guide gate provided with spaced concentrically bored ears pivotally engaged on the projecting portion of said stud for movement of the gate into and out of the film guiding plane thereof, the head of said screw being provided with an undercut portion in which the inner ear of said gate engages, said ear being formed to be disengaged from said undercut portion when said gate is angularly positioned out of said plane to permit removal and replacement of the gate over the projecting end of said stud.

13. In a film guide the combination with a film guide gate member provided with spaced parallel opposing grooves, of a rectangular film contact plate having opposite edges thereof engageable in said grooves for removal and replacement thereof on the gate member, a retaining member mounted on said gate member for movement normal to the plane of said plate engaged in said grooves and engageable in a central recess in the rear face of said plate, and spring means reacting on said gate member and yieldably urging said retaining member to engage in said recess and abut said plate.

14. In a film guide the combination with a gate member of longitudinally extending U-shaped formation and having the outer longitudinal edge portions of the legs of said formation recessed to form a transverse channel and having the ends of said channel undercut to form spaced parallel opposing relatively wide grooves, of a rectangular film contact plate having opposite relatively thin edges thereof engageable in said grooves for removal and replacement thereof on the gate member, a stud disposed normal to the plane of said plate in central relation therewith and carried by said gate member for longitudinal movement with respect thereto to engage and disengage a central recess in the back surface of said plate, and a coiled compression spring encircling said stud and reacting on said gate member and yieldably urging said stud to engage in said recess and abut the bottom thereof.

15. In a motion picture camera the combination with a casing provided with an access opening, of a removable cover closing said opening, a film guide gate within said casing and pivotally mounted on an axis normal to the plane of said opening for movement into and out of film guiding position, a stud on said gate and disposed parallel with the pivotal axis of said gate and projecting inwardly therefrom and outwardly therefrom into the plane of the closed position of said cover and engageable in a recess of the cover to permit the cover being closed only when said gate is in film guiding position, and spring latch means engaging the inner end of said stud to retain said gate in film guiding position.

In witness whereof I hereunto affix my signature this 27th day of January, 1928.

ALBERT S. HOWELL.